(12) United States Patent
Roessel et al.

(10) Patent No.: US 12,316,380 B2
(45) Date of Patent: May 27, 2025

(54) COMMUNICATION DEVICES AND METHODS FOR HIGH-THROUGHPUT, LOW-POWER SIGNALING

(71) Applicant: Apple Inc., Cupertino, CA (US)

(72) Inventors: Sabine Roessel, Munich (DE); Bernhard Raaf, Neuried Bavaria (DE); Bertram R. Gunzelmann, Koenigsbrunn (DE); Christian Drewes, Germering (DE); Josef Hausner, Germering (DE); Matthias Sauer, San Jose, CA (US); Zdravko Boos, Munich (DE)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 17/891,048

(22) Filed: Aug. 18, 2022

(65) Prior Publication Data
US 2023/0091119 A1 Mar. 23, 2023

Related U.S. Application Data (60) Provisional application No. 63/246,764, filed on Sep. 21, 2021.

(51) Int. Cl.
*H04B 10/2575* (2013.01)
(52) U.S. Cl.
CPC .............. *H04B 10/25758* (2013.01)
(58) Field of Classification Search
CPC .. H04B 10/2575; H04B 10/00; H04B 10/548; H04B 10/25751; H04B 10/25752; H04B 10/25753; H04B 10/25758; H04B 10/25759; H04B 10/25754; H04B 2210/006; H04J 14/06
See application file for complete search history.

(56) References Cited

U.S. PATENT DOCUMENTS

| | | | |
|---|---|---|---|
| 11,949,462 B2* | 4/2024 | Gunzelmann | H04B 10/63 |
| 2020/0028556 A1* | 1/2020 | Inoue | H04B 7/088 |
| 2020/0142066 A1* | 5/2020 | Sandborn | G01S 7/4817 |
| 2020/0333434 A1* | 10/2020 | Chancey | G09B 9/54 |
| 2022/0094901 A1* | 3/2022 | Nonn | H04N 13/254 |
| 2022/0216922 A1* | 7/2022 | Hashemi | H04B 10/548 |

OTHER PUBLICATIONS

"Magic Leap 1 Overview," Magic Leap Learn Guides, https://developer.magicleap.com/en-us/learn/guides/magic- leap-one-overview, Mar. 28, 2019, 5 pages.
"Microsoft launches HoloLens 2 with a strong business bent," PCWorld News, https://www.pcworld.com/article/403352/microsoft-launches-hololens-2-with-a-strong-business-bent.html, Feb. 24, 2019, 11 pages.
"CES 2019—Nreal," KGOnTech, https://kguttag.com/2019/01/29/ces-2019-nreal/, Jan. 29, 2019, 8 pages.
Lu et al., "Photonic Assisted Beam Steering for Millimeter-Wave and THz Antennas," University Duisburg-Essen, IEEE, 2018, 4 pages.
"Hexa-X The European 6G flagship project," European Conference on Networks and Communications (EuCNC), IEEE, 2021, 6 pages.

* cited by examiner

*Primary Examiner* — Hibret A Woldekidan
(74) *Attorney, Agent, or Firm* — Kilpatrick Townsend & Stockton LLP (57) ABSTRACT

The present application relates to devices and components including apparatus, systems, and methods for high-throughput, low-power signaling.

17 Claims, 8 Drawing Sheets

COMMUNICATION DEVICES AND METHODS FOR HIGH-THROUGHPUT, LOW-POWER SIGNALING

CROSS-REFERENCE TO RELATED APPLICATION

This application claims the benefit of U.S. Provisional Patent Application No. 63/246,764, filed on Sep. 21, 2021, which is herein incorporated by reference in its entirety for all purposes.

BACKGROUND

New use cases are developing that will test the signaling and processing capacities of wireless networks and devices. Augmented reality (AR) and extended reality (XR) are two use cases that will benefit from rapid transmission of large amounts of data over a wireless link and reduced power consumption by user devices. AR and XR applications mix real and virtual images for presentation to a user. These applications may be used in a variety of work and life sectors including industrial, logistics, retail, office administration, education, and health services.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The term "connected" may mean that two or more elements, at a common communication protocol layer, have an established signaling relationship with one another over a communication channel, link, interface, or reference point.

Figure 1:
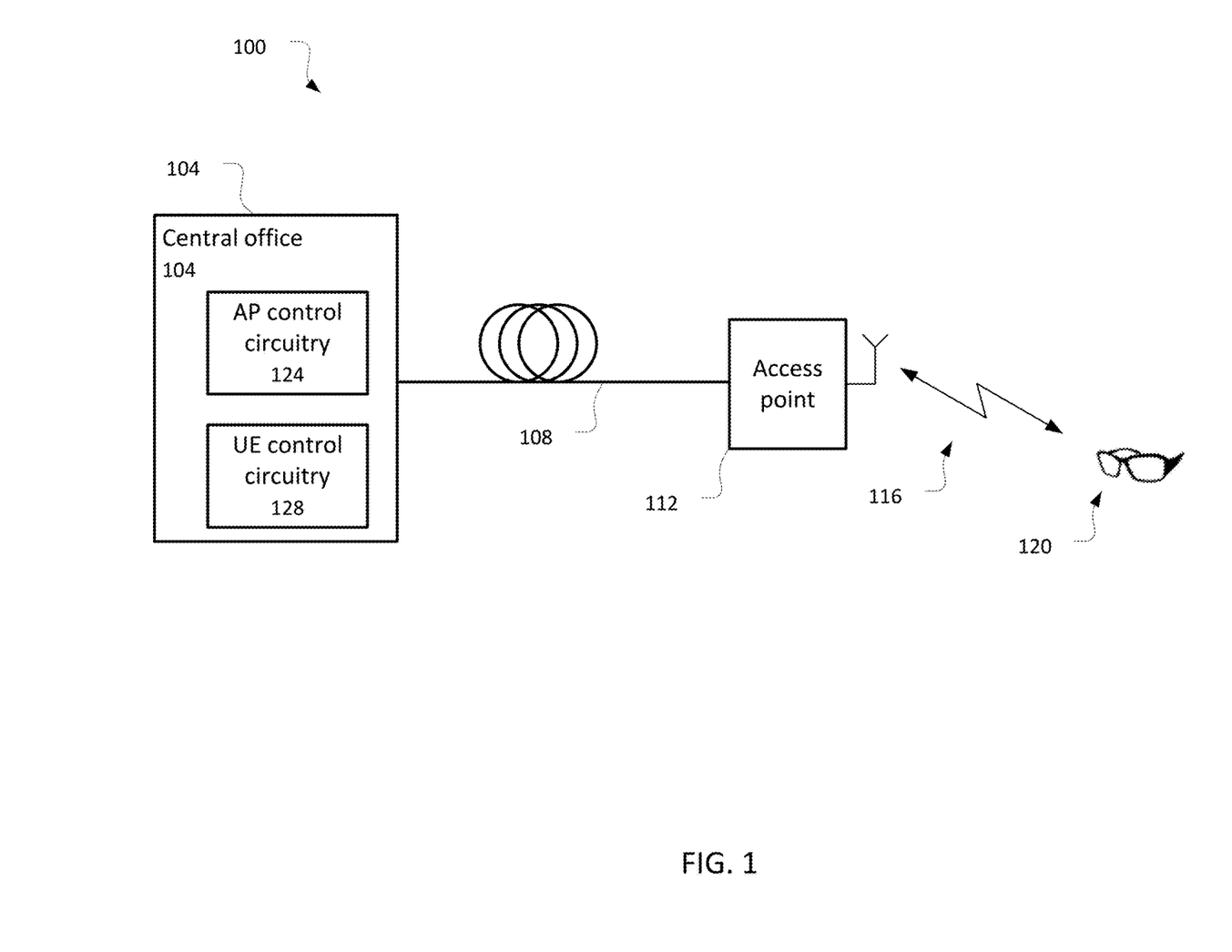
FIG. 1 illustrates an example system in accordance with some embodiments.

FIG. 1 illustrates an example system 100 in accordance with some embodiments. In particular, the system 100 may include a central office 104 that is communicatively coupled with an access point 112 via a fiber-optical connection 108. The fiber-optical connection 108 may include, for example, plastic optical fiber, multimode graded index fiber, or singlemode fiber.

The access point 112 may be communicatively coupled with the UE 120 via a wireless connection 116. The system 100 is a simplified version illustrating a single representation of each element for clarity and brevity. It should be understood that one or more of each of the elements may be present in embodiments of the system 100.

In some embodiments, the UE 120 may be a wearable UE such as smart glasses that may be capable of providing an AR/XR experience for a user. The smart glasses may be capable of meeting the demands of a human sensory system in terms of optical and audio output. For example, the smart glasses may provide realistic six-degrees of freedom (6DoF) high definition three-dimensional visual rendering of individuals or objects, as well as three-dimensional audio rendering to immerse the user in an AR/XR environment. To provide the desired experience, the smart glasses may reduce motion-to-photon latency, have a lightweight form factor that approaches normal eyewear to allow the smart glasses to be comfortably worn for long hours, and utilize an ultra-low power consumption.

Key performance indicators (KPIs) may be defined for smart glasses for AR/XR applications. For example, the smart glasses may have KPIs of: 4K (or 8K or 16K) resolution per eye; 240 frames per second (fps) (with fallback of 120 fps); 65° (or 90°) of a flat horizontal field-of-view (H-FOV); 170° of a curved H-FOV; 35° (or 60°) of a flat vertical field-of-view (V-FOV); 130° of a curved V-FOV; 60 (or 120) pixel per degree (PPD) density; 2, 4, 5, or 6 HW focal planes; 480 Hz (or 240 Hz fallback) display refresh rate; the brightness greater than 10,000 nits; a contrast greater than 1000:1; the color space of RGB, YUV 4:2:0 8 bit, [YUV 4:4:4, 12 bit]; a transparency of greater than 70%; and a power consumption of 2 W. While these KPIs may be achievable and desirable targets that may be obtained by embodiments of the disclosure, smart glasses of embodiments of the present disclosure may or may not meet these KPIs.

Many of the desired functionalities and KPIs of smart glasses for AR/XR applications may be difficult to achieve in a small, lightweight form factor. For example, processing capabilities required to satisfy the needs of AR/XR applications would typically require a heavy form factor device that consumes a significant amount of power. And offloading compute tasks in a traditional system could compromise the low-latency, high data rate communication desired from the AR/XR applications. Thus, embodiments describe components of the system 100 configured to facilitate offloading of the vast majority of compute tasks from the smart glasses, while still maintaining the low-latency, high data rate communications to enable the AR/XR experience.

The compute/memory intensive tasks of the system 100 may largely be performed in the central office 104, which may be provided with sufficiently high compute capabilities to facilitate the desired offloading of the communication tasks. Concentrating the compute/memory intensive tasks within the central office 104 may reduce complexity and power consumption in the access point 112 and the UE 120, which may also reduce delay that may occur in the entire link between the central office 104 and the UE 120.

The wireless connection 116 may provide a broadband radio communication link, which may be in a terahertz (THz) frequency range and have a high bandwidth. As used herein, a THz frequency range includes frequencies greater than 100 GHz. The optical front-haul link, via the fiber-optical connection 108, may have a bandwidth that is higher than the bandwidth of the wireless connection 116 by a factor. As will be described in further detail below, the central office 104 may provide an analog waveform on the fiber-optical connection 108 that the access point 112 may easily translate to the radio-frequency (RF) waveform to be transmitted on the wireless connection 116.

The central office 104 may include AP control circuitry 124 to provide the access point 112 with control signals for the wireless connection 116. The central office 104 may also include UE control circuitry 128 to provide the UE 120 with control signals for the wireless connection 116 and data signals for user output.

In some embodiments, to reduce complexity of the UE 120, the UE control circuitry 128 may include a display driver that is configured to provide pixel-level data to one or more displays on the UE 120. This data may be provided to the UE 120 in a just-in-time manner to reduce a buffer size needed at the UE 120. For example, the data may be provided to a display of the UE 120 consistent with the scan type (for example, interlaced or progressive) and at a rate that matches the scan rate of the display.

In some embodiments, the central office 104 may control the sensing that occurs with respect to the wireless connection 116 to calculate various communication parameters. The sensing may be used to determine a link quality (for example, channel state information) and perform beam management for directed transmissions/receptions by the access point 112 and the UE 120. In some examples, the central office 104 may periodically control the access point 112 to perform a beam sweeping operation by sending reference signals on a plurality of beams. The UE 120 may measure the plurality of beams and transmit the measurements to the central office 104. In some embodiments, the measurement data may be transmitted to the central office 104 in a raw form to avoid the UE 120 having to process the measurements. The central office 104 may then use the measurement data to determine the desired beams to use at both the access point 112 and the UE 120. In some embodiments, one or more sensors or cameras integrated within or coupled to the access point 112 or UE 120, may feed back sensor/image data that may be used by the central office 104 to determine the desired beams. In this manner, the location of the UE 120 relative to the access point 112 may be tracked to facilitate efficient communications.

In some embodiments, the central office 104 may control the sensing of the wireless connection 116 by providing the optical signal with a radar component. Feedback from the radar reflections sensed at the access point 112 may be provided to the central office 104 to enable the central office 104 to determine a location of objects around the access point 112. For example, in some embodiments, the access point 112 may send an uplink signal based on the reflections to the central office 104. The central office 104 may process the uplink signal to determine a direction/range of the UE 120 relative to the access point 112 and may calculate beamforming weights based on the direction/range of the UE 120.

Upon obtaining the feedback from the access point 112 and UE 120, the central office 104 may generate the communication parameters, which may then be transmitted to the access point 112 and UE 120 to control aspects of communication over the wireless connection 116. The communication parameters may relate to transmit/receive beams, uplink/downlink transmit power, modulation and coding schemes, joint bandwidth, polarization, forward error correction (FEC), or carrier/local oscillator (LO) frequencies.

In one example, the AP control circuitry 124 may calculate beamforming weights or precoding matrices that are transmitted to the access point 112. The access point 112 may utilize the beamforming weights/precoding matrices to form transmit/receive beams to facilitate communications over the wireless connection 116. In one example, the central office 104 may calculate precoding matrices that include digital precoding matrices and analog precoding weights. The digital precoding of one or more data streams may consist of open loop precoding, e.g. Alamouti precoding, diversity precoding, e.g. cyclic delay diversity, or closed loop precoding, where channel state information (CSI) is fed back and exploited. Digital precoding may be applied with the central office, whereas analog precoding may be applied in the access point 112 to form transmit/receive beams to facilitate communications over the wireless connection 116.

In a manner similar to above, the UE control circuitry 128 may calculate and transmit beamforming weights/precoding matrices to the UE 120, which the UE 120 may utilize to form transmit/receive beams at the UE 120. Beamforming may be especially useful in the system 100 given the relatively high level of attenuation wireless signals may experience in the terahertz frequency range.

The central office 104 is shown with AP control circuitry 124 to control communication (and other) parameters for the access point 112 and UE control circuitry 128 to control communication (and other) parameters for the UE 120.

While not explicitly shown, the central office 104 may include communication resource control (CRC) circuitry to control communication over the wireless channel 116 for both the access point 112 and the UE 120. In these embodiments, the resources of the CRC circuitry may be shared by the AP control circuitry 124 and the UE control circuitry 128. This may be done in a number of manners including, for example, a first portion of the CRC circuitry being dedicated to the AP control circuitry 124 and a second portion of the CRC circuitry being dedicated to the UE control circuitry 128. Other sharing arrangements may also be used.

Both the access point 112 and the UE 120 may include antenna arrays that may be used to form the transmit/receive beams. The antennas of the arrays may include microstrip antennas, printed antennas fabricated on the surface of one or more printed circuit boards, patch antennas, or phased array antennas. The antennas may be small given the high-frequencies of the signals transmitted over the wireless connection 116. This may provide flexibility in designing the UE 120 to accommodate an antenna array with a small footprint.

While some embodiments describe the UE 120 as smart glasses to enable XR/AR experiences, the system 100 may be additionally/alternatively utilized to facilitate other end-user applications with other UEs.

The system 100 may utilize time division duplexing (TDD). The downlink communications may rely on a quadrature amplitude modulation (QAM) and have a high data rate of more than 50 gigabits per second, while the uplink communications may rely on a simpler modulation scheme such as amplitude shift keying (ASK) and may have a relatively lower data rate of around 1 MB per second. Given the quality of the link, little-to-no forward error correction may be needed in the communications of the system 100.

Figure 2:
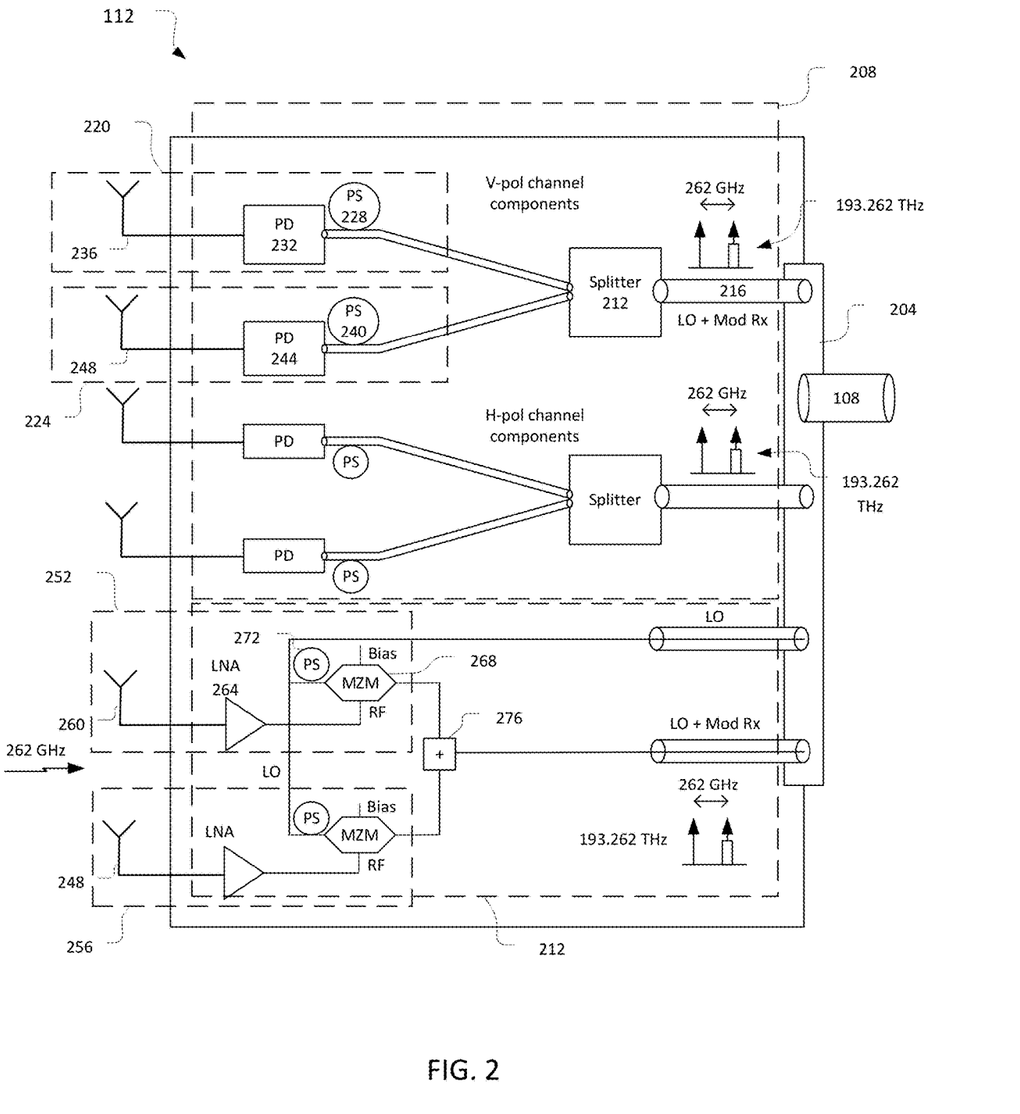
FIG. 2 illustrates an access point in accordance with some embodiments.

FIG. 2 illustrates the access point 112 in accordance with some embodiments. The access point 112 may include an interface 204 that is to couple with the fiber-optical connection 108. The interface may be coupled with downlink components 208 and uplink components 212.

The downlink optical signal transmitted by the optical fiber connection 108 may include two polarization channels, a vertical-polarization (V-pol) channel and a horizontal-polarization (H-pol) channel. Each channel may have a 25 GHz bandwidth. The optical signal may be in the THz frequency range and, in some examples, may include a frequency of 350 THz (corresponding to a wavelength of 850 nanometers (nm)) or 193 THz (corresponding to a wavelength of 1550 nm). The downlink optical signal may include an LO component and a modulated signal component (Mod Rx) separated by a frequency of, for example, 262 GHz. The modulated signal component may carry a data channel and a control channel. The control channel may include control signals for controlling various components of the access point 112 or UE 120 and the data channel may include the data for the UE 120.

The downlink components 208 may include a first set of components for receiving the V-pol channel of the optical signal and a second set of components for receiving the H-pol channel of the optical signal. The first set of components may be referred to as the V-pol channel components and the second set of components may be referred to as the H-pol channel components.

The V-pol channel components may include a splitter 214 coupled with the interface 204 via an optical connector 216 to receive the V-pol channel of the optical signal. The splitter

214 may provide a first portion of the optical signal to a first transmit chain 220 and a second portion of the optical signal to a second transmit chain 224.

The first transmit chain 220 may include a phase shifter (PS) 228, a photodiode (PD) 232, and an antenna 236. The second transmit chain 224 may also include a phase shifter 240, a photodiode 244, and an antenna 248. The phase shifters 228 and 240 may be provided with a control signal, from the AP control circuitry 124, that controls an amount phase shift, or delay, the phase shifters 228 and 240 provide to their respective portions of the optical signal. The phase shifters 228 and 240 may be plasmonic phase shifters that are integrated within a chip with a relatively small footprint.

The portions of the optical signal, with their respective delays, may be input to the photodiodes 232 and 240. The photodiodes 232 and 240 may provide photomixing to generate electrical signals based on their respective optical inputs. The electrical signals may be provided to the antennas 236 and 248, which transmit respective over-the-air (OTA) signals. The antennas 236 and 248 may be bow-tie antennas or other dipole equivalent antennas designed to transmit signals with a vertical polarization.

The photodiodes 232 and 240 may provide the electrical signals as a difference between the frequency of the LO component and the modulated signal component of the optical signal. Thus, the electrical signals (and resulting OTA signals) may have a frequency of approximately 262 GHz in some embodiments. This may provide for high-frequency communications over the wireless connection 116 in the THz frequency range.

In this manner, the central office 104 may generate the optical signal in a manner such that its conversion to the electrical domain by the photodiodes 232 and 240 results in the desired waveform for transmission over the wireless connection 116. Therefore, the access point 112 may not need to perform demodulation of the optical signal and remodulation into a THz waveform. Instead, the optical resources will be tightly coupled to the THz resources. For example, a bandwidth and TDD structure of the optical signal on the fiber-optical connection 108 may be maintained by the OTA signals that are transmitted by antennas 236 and 248.

The photodiodes 232 and 240 may also provide the electrical signals with a squared difference between frequency of the LO component and the data component of the optical signal; however, this part of the signal will be filtered out by the antennas 236 and 248, which may operate as low-pass filters.

In generating the electrical signals, the photodiodes 232 and 240 may also directly generate the output power of the electrical signals. This gain provided by the photodiodes 232 and 240 may be controlled by control signals from the AP control circuitry 124 based on, for example, the quality of the wireless connection 116, which may be determined by the central office 104 based on measurements fed back from the UE 120.

The H-pol components may be similar to, and operate in the same manner as, the V-pol components, except operating on the H-pol channel of the optical signal.

The uplink components 212 may include a first receive chain 252 and a second receive chain 256 to receive OTAs signals with a carrier frequency of 262 GHz, or frequency within another band in the THz frequency range.

The first receive chain 252 may include an antenna 260 to receive the OTA signal. The antenna 260 may provide an electrical radio-frequency (RF) signal based on the OTA signal to a low-noise amplifier (LNA) 264. The LNA 264 may provide an amplified version of the RF signal to a Mach-Zehnder modulator (MZM) 268.

The first receive chain 252 may also include a phase shifter 272 that receives an LO signal, which may be part of the downlink optical signal. The phase shifter 272 may provide a phase shift to the LO signal and provide the phase-shifted LO signal to an input of the MZM 268. The MZM 268 may also receive a bias signal. The MZM 268 may output an optical signal based on the received inputs. In some embodiments, gain control in the uplink direction may be accomplished by way of the LO signal in the optical domain.

The second receive chain 256 may include components similar to like-named components of the first receive chain 252 to convert another OTA signal to another second optical signal.

The uplink components 212 may also include a combiner 276 to receive and combine the first optical signal from the first receive chain 252 and the second optical signal from the second receive chain 256. The combiner 276 may output the combined optical signal as an uplink signal that includes an LO component and an uplink data component having a frequency difference of 262 GHz. The uplink signal may have a frequency of 193.262 THz.

The amplification from the LNAs and the phase shifting from the phase shifters on the uplink signals in the electrical domain, may allow for the antenna array gain to be achieved before converting to the optical domain and sending on the fiber-optical connection 108.

The antennas of the access point 112 may include antenna elements arranged in one or more antenna arrays/panels. The antenna elements may include bowtie antenna pairs or other dipole-equivalent antennas designed to transmit/receive signals with horizontal/vertical polarizations. In some embodiments, the same antennas may be used for both the receive chains and the transmit chains. In other embodiments, dedicated transmit antennas may be used for the transmit chains and dedicated receive antennas may be used for the receive chains.

In some embodiments, a dielectric lens may be coupled with antennas of the antenna arrays/panels in order to provide additional amplification to the signals.

Figure 3:
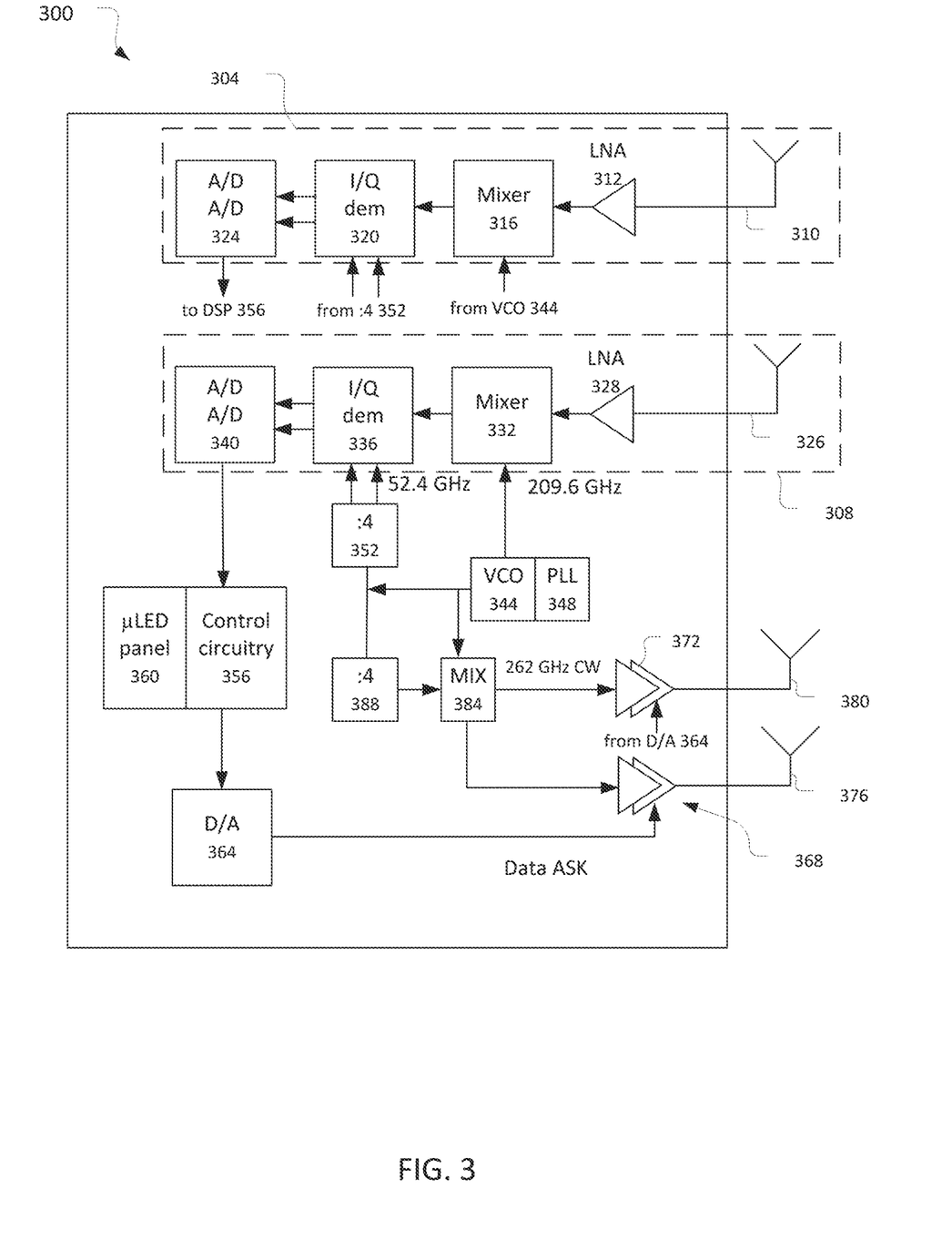
FIG. 3 illustrates a wearable user equipment (UE) in accordance with some embodiments.

FIG. 3 illustrates a wearable UE 300 in accordance with some embodiments. The wearable UE 300 may be similar to, and substantially interchangeable with, UE 120. In some embodiments, the wearable UE 300 may be AR/XR smart glasses. The wearable UE 300 may include a first receive chain 304 and a second receive chain 308.

The first receive chain 304 may include an antenna 310, an LNA 312, a mixer 316, an in-phase/quadrature demodulator (I/Q dem) 320, and an analog-to-digital converter (A/D) 324. Similarly, the second receive chain 308 may include an antenna 326, an LNA 328, a mixer 332, an I/Q dem 336, and an A/D 340.

The receive chains 304 and 308 may operate based on a sliding intermediate-frequency receive concept. Briefly, with respect to the first receive chain 304, the antenna 310 may receive an OTA signal and provide a resultant electrical signal to the LNA 312 for amplification. The amplified RF signal may be provided to the mixer 316. The mixer 316 may receive an LO signal (LO1) from a voltage controlled oscillator (VCO) 344, which may be coupled with a phase locked loop (PLL) 348. The VCO 344 may be a resonant tunneling diode (RTD) that generates LO1 directly in the THz frequency range, for example, at 209.6 GHz, with an acceptable noise figure.

The mixer 316 may mix the RF signal and the LO1 signal to generate a mixed signal that is provided to the I/Q dem 320.

In addition to the mixed-signal, the I/Q dem 320 may receive two LO2 signals, which may be provided by divide-by-4 block (:4) 352 dividing LO1 by four. The LO2 signals may, therefore, be at 52.4 GHz. The I/Q dem 320 may use the LO2 signals to derive precise I/Q matching at a relatively low intermediate frequency to support quadrature amplitude modulation (QAM).

The I/Q dem 320 may provide the I/Q components to the A/D 324, which may have an A/D converter for each of the components. The digital signal generated by the A/D 324 may be provided to control circuitry 356, which may be a digital signal processor (DSP). The control circuitry 356 may demodulate the QAM symbols to obtain data that is used to drive a display, such as a micro-light emitting diode (μLED) panel 360. The data may be pixel data that is in a format that is provided by a remote display driver that resides in the UE control circuitry 128. Thus, the control circuitry 356 may not need to perform significant processing of the signal, other than some relatively simple quadrature amplitude demodulation.

The components of the receive chain 308 may operate in a manner similar to like-named components of receive chain 304. Thus, the A/D 340 may also provide a digital signal to the control circuitry 356, which may be used to drive the μLED panel 360.

In the uplink direction, the control circuitry 356 may modulate data into a digital signal with a relatively simple modulation scheme such as, for example, amplitude shift keying (ASK). The digital signal may be provided to a digital-to-analog converter (D/A) 364 for conversion to the analog domain. The analog signal, carrying data ASK, for example, may be provided to power amplifiers 368 and 372 coupled with transmit antennas 376 and 380, respectively.

The LO1 signal provided to the receive chains may also be reused for the transmit side. For example, the LO1 signal may be provided to a mixer 388 both directly and through a divide-by-four block (:4) 376 (as an LO2 signal). Thus, the mixer 384 may mix the LO1 and the LO2 signal to provide a signal at the desired carrier frequency of the wireless connection 116, for example, 262 GHz.

The power amplifiers 368 and 372 may receive the data ASK as a bias input, and may amplify the signal from the mixer 384 based on the bias input. Providing the data ASK signal as the bias input may provide an on-off keying for the amplified signal that is to be transmitted by the antennas 376 and 380.

In some embodiments, the complexity of the circuitry of the wearable UE 300 may be reduced by shifting the majority of the compute-intensive operations to the central office 104. For example, tasks like reordering of data from the natural display order to the order to be fed into the μLED panel 360 may not be implemented by the wearable UE 300 but rather in the central office 104. The data transmitted from the central office 104 to the wearable UE 300 may be in a format that enables directly feeding the μLED panel 360. In some embodiments, this may be achieved by introducing a display driver twin per wearable UE 300 hardware and per eye in the central office 104.

In some embodiments, if the wearable UE 300 is newly associated with the central office 104, it may undergo an initial calibration phase. This may enable set-up of a pair of display driver twins (one per eye) of the display's control mechanism combined with pre-distortion, aberration correction, color calibration, brightness adaptation, etc. that may be specific to the hardware of the wearable UE 300 and per eye. The calibration information (for example, desired pre-distortion, correction, or other calibration information) may be acquired by the central office 104 in the calibration phase while the information on instantaneously desired brightness adaptation may be computed from: knowledge in the central office 104 of active light sources in the room, and cameras and ambient light sensors in the location.

Based on the digital driver twins and the data to be sent to the wearable UE 200, the central office 104 may modulate the terahertz communication data in such a way that it seamlessly drives the μLED panel 360 of the wearable UE 300. The high data rate of the terahertz communication link may enable reduction or complete elimination of high-compression video codecs from the wearable UE 300. The computation at the central office 104 of the data stream may directly enable chroma subsampling that may take into account a control mechanism of the μLED panel 360.

Figure 4:
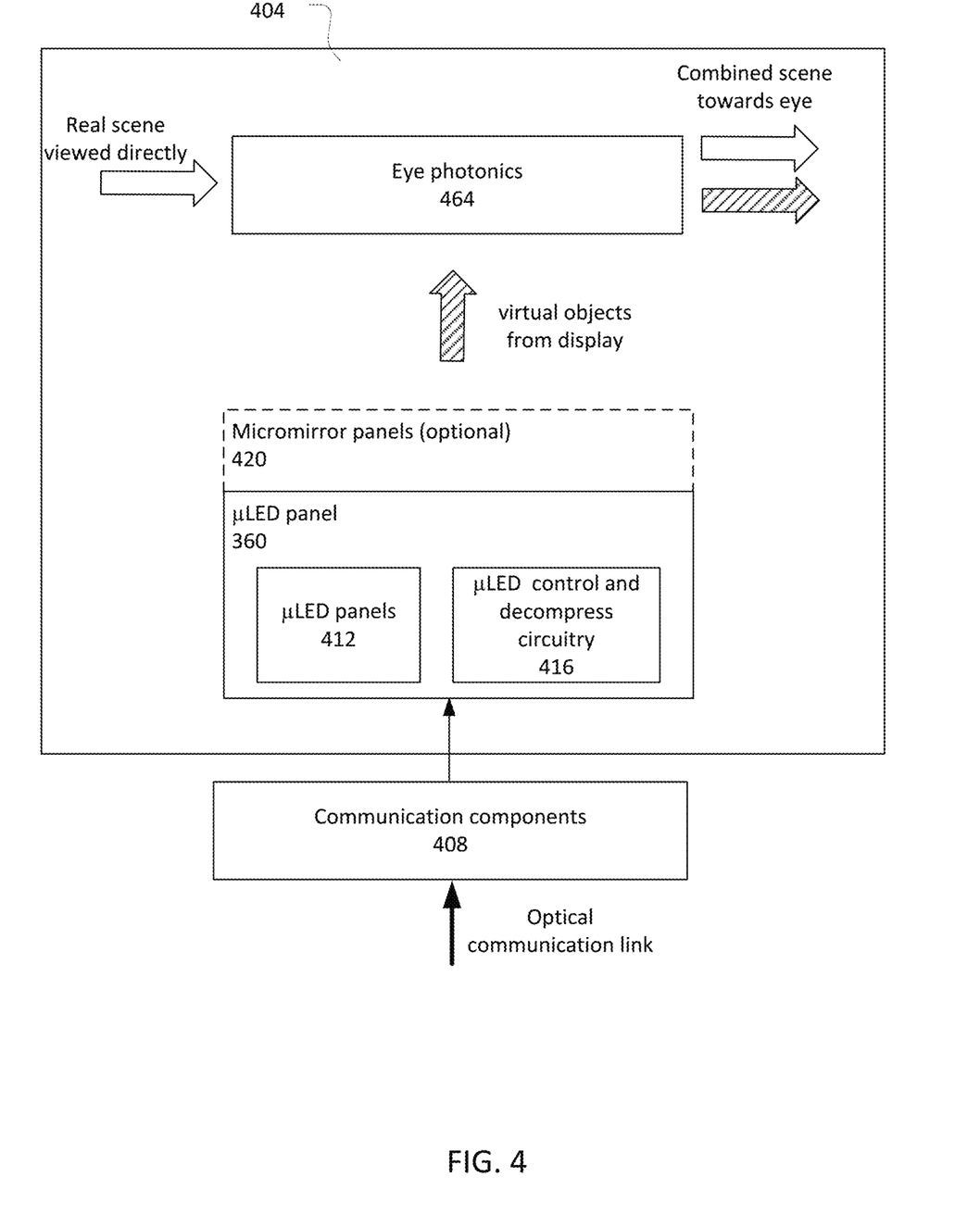
FIG. 4 illustrates components of the wearable UE in accordance with some embodiments.

FIG. 4 illustrates components of the wearable UE 300 in accordance with some embodiments. The components may include optical components 404 and communication components 408.

The optical components 404 may include the μLED panel 360, which may include μLED panels 412 and a μLED control and decompress circuitry 416. In some embodiments, the μLED control and decompress circuitry 416 may correspond to the control circuitry 356, or portions thereof. In other embodiments, a separate controller may be used.

The communication components 408 may be similar to those shown and described in FIG. 3 with the exception of the μLED panel 360 and, potentially, the control circuitry 356.

In some embodiments, the μLED control and decompress circuitry 416 may receive the pixel data from the optical communication link and drive the μLED panel 360 to output an image. In some embodiments, the image may be additionally modulated, or redirected, through micromirror panels 420 and provided to eye photonics 464 of the optical components 404. The image may represent virtual objects originating from the μLED panel 360.

The eye photonics 464 may combine the virtual objects from the μLED panel 360 with images from a real scene that are viewed directly and provide a combined scene toward eyes of a user. In this manner, the user may view a combination of real and virtual images.

Figure 5:
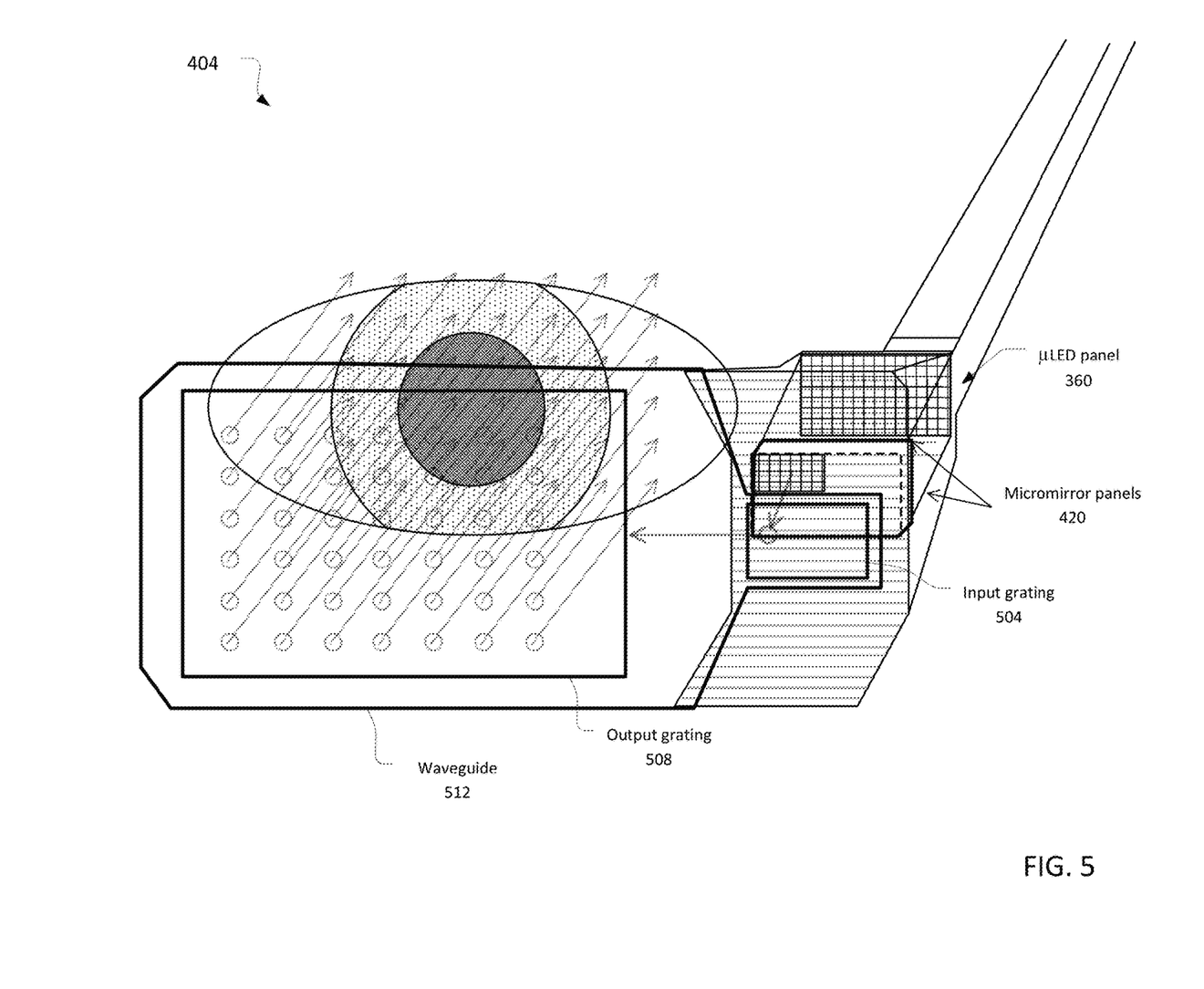
FIG. 5 illustrates optical components of the wearable UE in accordance with some embodiments.

FIG. 5 illustrates optical components 404 of the wearable UE 300 in accordance with some embodiments. The optical components 404 may include the μLED panel 360 driven by control circuitry 356 as introduced above with respect to FIG. 3.

The μLED panel 360 may provide an image to the micromirror panels 420, which in turn provide the image to an input grating 504. The input grating 504 may provide the image to an output grating 508 via a waveguide 512. In some embodiments, the waveguide 512 may be a two-dimensional waveguide/light guide technology that is enhanced with one or more layers of meta-surface for a high optical KPI. The output grating 508 may display the image to the user.

Figure 6:
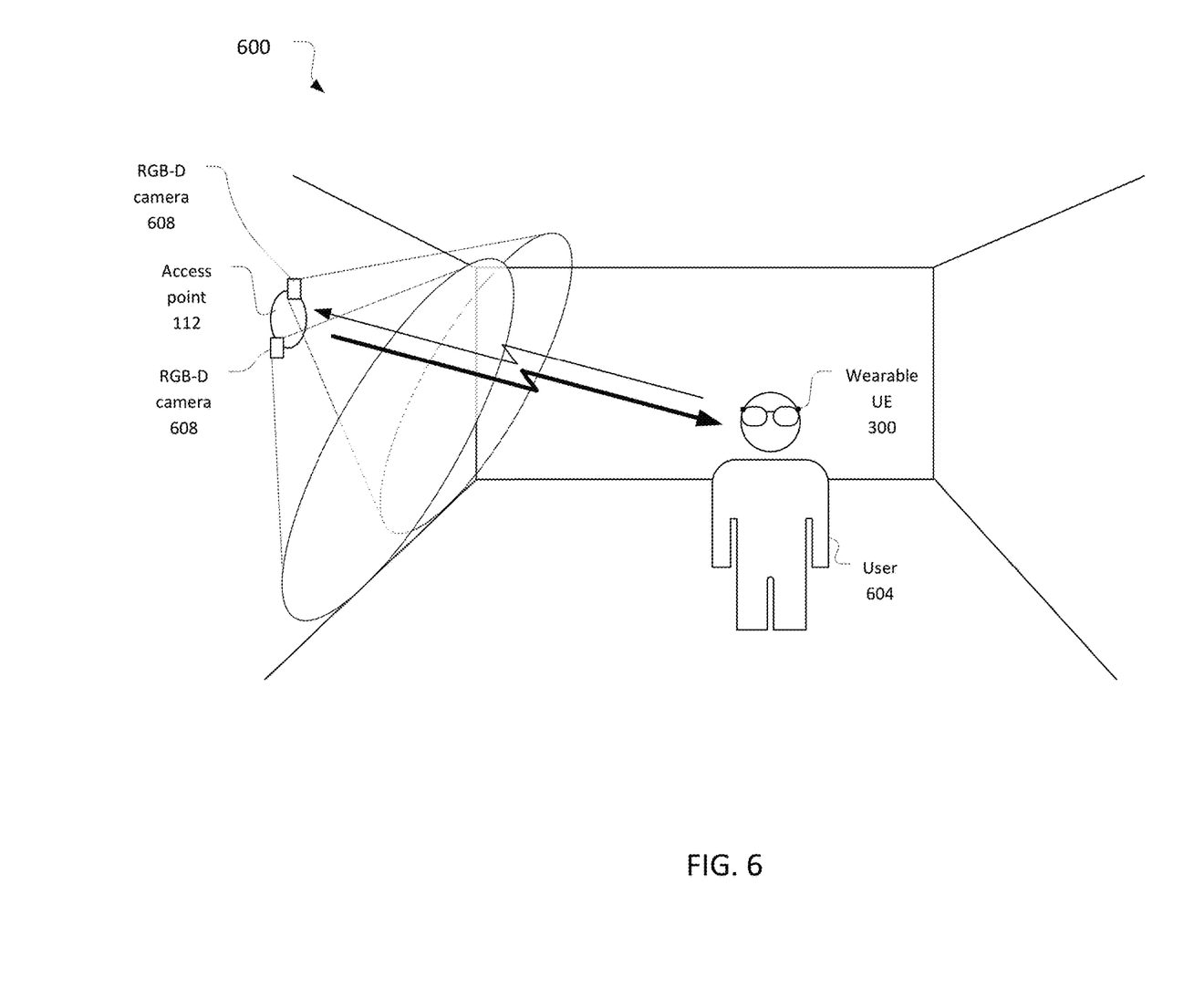
FIG. 6 illustrates an environment having components to provide a user with an XR/AR experience in accordance with some embodiments.

FIG. 6 illustrates an environment 600 having components to provide a user 604 with an XR/AR experience in accordance with some embodiments. The user 604 may be equipped with the wearable UE 300, shown as smart glasses.

The access point 112 may provide downlink and uplink communication links with the wearable UE 300. In general, the downlink communication link may be provided with higher throughput capabilities than the uplink communication link. This may reduce transmit complexity at the wearable UE 300 without compromising performance.

The environment 600 may further include a plurality of depth-sensing cameras such as, for example, red, green, blue+depth (RGB-D) cameras 608. The RGB-D cameras 608 may be wide-angle cameras with a depth sensor. The RGB-D cameras 608 may be integrated or otherwise coupled with the access point 112. The RGB-D cameras 608 may capture details of an environment adjacent to the user 604 and feed back image and depth data to the AP control circuitry 124. In this manner, the AP control circuitry 124 may be able to perform an outside-in dense room reconstruction that may be used to generate display data that is transmitted to the wearable UE 300 to support the AR/XR experience. In some embodiments, the AP control circuitry 124 may also use the image and depth information to adjust the communication parameters used by the access point 112 and the wearable UE 300.

The environment 600, which may include a number of RGB-D cameras (such as RGB-D cameras 608) and sensors placed throughout the location, may enable simultaneous localization and mapping (SLAM) or visual odometry (VO) and dense reconstruction for an existing XR location. This may provide the central office 104 with data that it can use to locate and shape moving individuals and objects in real-time. In order to have timely and sufficiently accurate data of the dynamic scene, embodiments may include mounted high-speed RGB-D cameras with a sufficiently narrow field of view (FOV) for the desired depth resolution and a sufficiently wide FOV for reducing the number of required equipment. The amount of cameras desired may depend on their FOV and the targeted resolution. Embodiments may also generate/send relative uplink block error rates (BLERs) for disambiguation and recalibration requests.

Additional sensors and cameras may be added to the environment 600 to enable more rigorous outside-in SLAM, VO, and six-degrees of freedom (6DoF) tracking of the wearable UE 300/user 604. The rigorous outside-in SLAM, VO, and 6DoF tracking may be based on ambient sensors in the environment 600 and existing pre-knowledge about the environment 600 as well as information about the form factor geometry of the wearable UE 300.

State of the art visual odometry and 6DoF tracking may fuse RGB-D camera sensor inputs with data obtained from an inertial measurement unit (IMU) that would be on a UE. In contrast, various embodiments may include 6DoF tracking at the central office 104. The 6DoF tracking at the central office 104 may be based on knowledge of: the environment 600; position, orientation and calibration data related to cameras and sensors (for example, infrared (IR) sensors) in the environment 600; and characteristics of the wearable UE 300 obtained in an authentication phase (for example, type and form factor geometry of the wearable UE 300). The central office 104 may calculate and track a head position and orientation (for example, 6DoF head pose) of the user 604, which may be fed back to the central office 104 at, for example, 240 frames per second (fps) for 3D (and 6DoF-true) rendering by the UE control circuitry 128 of the central office 104.

In some embodiments, the central office 104 may perform drift correction to 6DoF tracking based on IR sensor data from the environment 600 that is received in response to multiple IR probing sources from reflectors at the wearable UE 300. The IR probing sources may be, for example, reflectors based on metasurface panels.

Some embodiments may include gaze tracking operations performed at the central office 104. State of the art solutions for gaze tracking would be based on equipment on a UE that includes, for example, IR LEDs and at least two IR cameras per eye as well as the μcontroller/CPU for sensor fusion and calculation of the gaze orientation in relation to the head pose.

In some embodiments, gaze tracking may include coarse pupil detection with simple on-glasses compute and upstreaming of (partial) eye tracking images labelled with the coarse pupil detection (and the 6DoF head pose). The central office 104 may derive the gaze direction and track the gaze over time for gaze prediction.

In some embodiments, a more rigorous outside-in gaze tracking may be used. This may include relayed sensing operations like 6DoF tracking and gaze tracking that exploits metasurfaces. In contrast to 6DoF tracking, however, the metasurfaces may be used to relay low power IR probing via the glasses frame or—if transparent to visible light—via an additional surface directly brought onto the waveguide/lightguide towards the eyes and to relay the response of the IR probing that includes the information on the eye pupil's pose towards the room. The IR sensors' data from the environment 600 may be fused in the central office 104 to provide the gaze pose to foveated rendering operations.

In some embodiments, additional 3D rendering tasks may be performed at the central office 104. In traditional systems, heavy 3D rendering tasks may be at least partially offloaded to an edge compute server. State of the art solutions split rendering where asynchronous time warping of the rendered stereo images may be performed on the glasses to push motion-to-photon latency below 5 ms and distributed rendering as a generalized concept for distributing computer vision tasks between the edge compute server and XR devices. In contrast, based on the XR glasses eye photon architecture, and without excluding other 3D rendering optimizations, various embodiments include the central office 104 performing the following tasks: computing improved soft-edge occlusion; matching virtual content with focal-plane(s); off-focal-plane data rate reduction; and approaching hard-edge occlusion by focal plane-specific rendering.

To compute improved soft-edge occlusion at the central office 104, the central office 104 may fill in a real scene's surrogate pixels at borders of a virtual object occluding the real scene as well as at the borders of the virtual shadows in the real scene due to a virtual object. The fill-in pixels may be computed from high-performing ambient cameras and a permanently updated dense room reconstruction in the central office 104. Computing improved soft-edge occlusion based on fast RGB-D cameras and 6DoF head pose tracking may be based on two wide-angle RGB-D cameras integrated into the access point 112.

To match virtual content with focal-plane(s) in the central office 104, the central office 104 may perform the following focal-plane related tasks: controlling tunable metalens(es) for a variable focal plane concept; down-selection of focal planes to be served based on gaze tracking; distribution of the to-be-rendered content across multiple HW-manifest focal planes; and alternatively assigning time slots of the to-be-rendered content for a variable focal plane concept based on a tunable metalens.

Off-focal-plane data rate reduction may be performed by the central office 104 performing rendering with respect to the appropriate focal plane(s). Resolution degradations per focal plane for data rate optimization may be decided in the central office 104 by identifying the relevant focal plane from gaze tracking performed as well in the central office 104.

Approaching hard-edge occlusion by focal plane-specific rendering in the central office 104 may include the following tasks: identification of real scene objects that occlude the virtual object, shadowing and lighting caused by the real scene that affect the virtual object, real scene zones that are occluded by the virtual object, light sources in the real scene that create "virtual shadows" of the virtual object, and modified lighting and reflections in the real scene from the virtual object; partitioning virtual content (including additional virtual content, for example, from shadowing the real scene) across hardware-manifest focal planes; partitioning virtual content (including additional virtual content, for example, from shadowing the real scene) across focal plane time slots for variable focal plane concepts based on a single tunable metalens; and calculation of accurate occlusion masks based on ray back propagation from the focal plane to the polarization converting metasurface, for example, the shutter plane.

Figure 7:
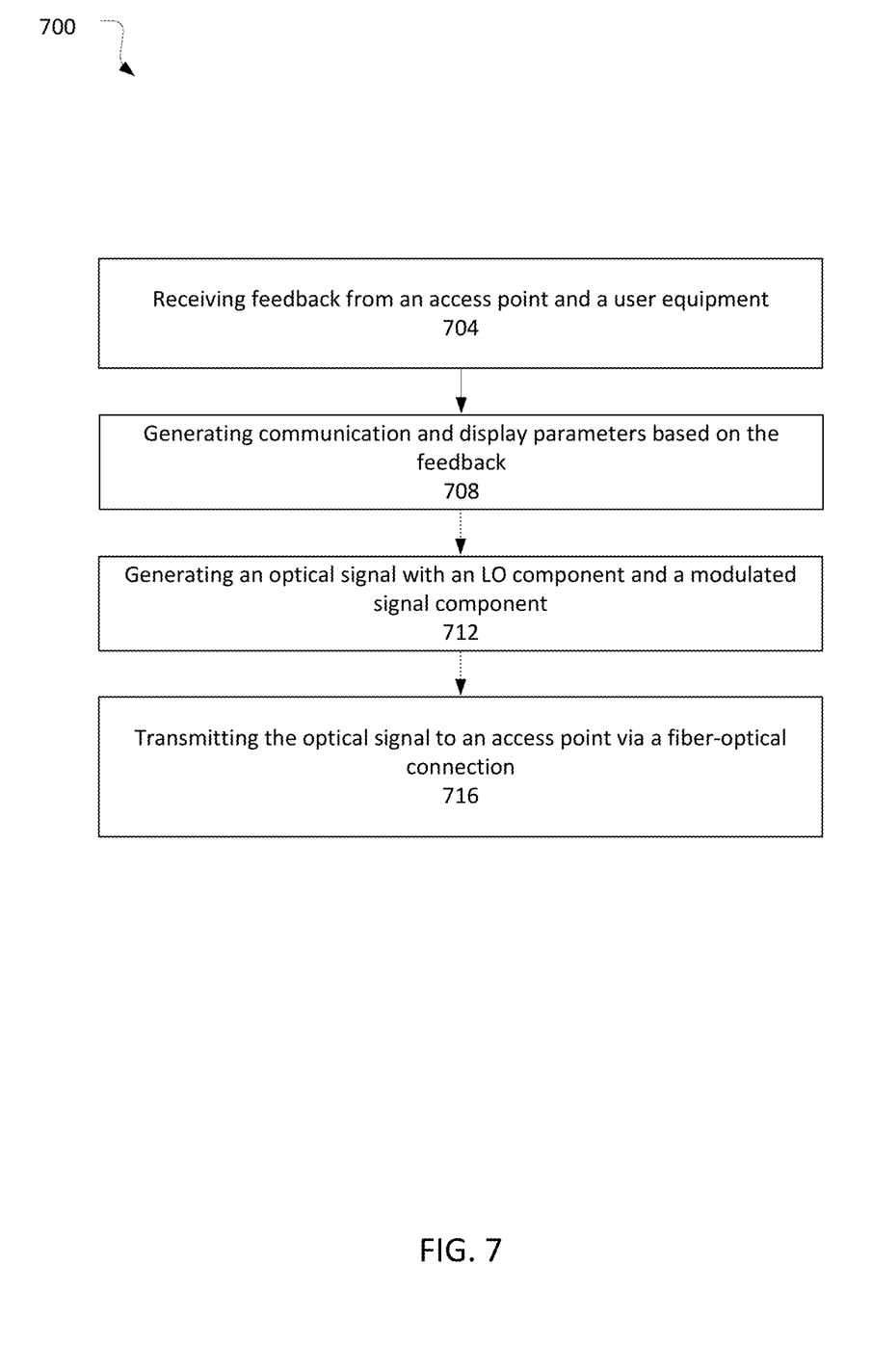
FIG. 7 illustrates an operational flow/algorithmic structure in accordance with some embodiments.

FIG. 7 illustrates an operational flow/algorithmic structure 700 in accordance with some embodiments. The operation flow/algorithmic structure 700 may be performed or implemented by a central office such as, for example, central office 104 or computing system 900; or components thereof such as AP control circuitry 124 or UE control circuitry.

The operation flow/algorithmic structure 700 may include, at 704, receiving feedback from an access point and a user equipment. The feedback may include link power or quality measurements taken by the access point or UE.

The operation flow/algorithmic structure 700 may further include, at 708, generating communication parameters based on the feedback. The communication parameters may include uplink/downlink power control parameters, beam management parameters (for example, phase shifts), etc.

The operation flow/algorithmic structure 700 may further include, at 712, generating an optical signal with an LO component and a modulated signal component. The optical signal may have a wavelength within a range from 650 nanometers (nm) to 1625 nm. In some embodiments, the wavelength may be 850 nm. The optical signal may have a high-THz frequency in which a difference between the LO component and the modulated component corresponds to a THz frequency of a carrier signal that is to be transmitted by an access point as an OTA signal.

The modulated signal component may include a control channel and a data channel. The control channel may include control signals to provide the communication parameters determined at 708. The data channel may include pixel data that may be provided to drive a display on the UE.

The operation flow/algorithmic structure 700 may further include, at 716, transmitting the optical signal to the access point via a fiber-optical connection.

Figure 8:
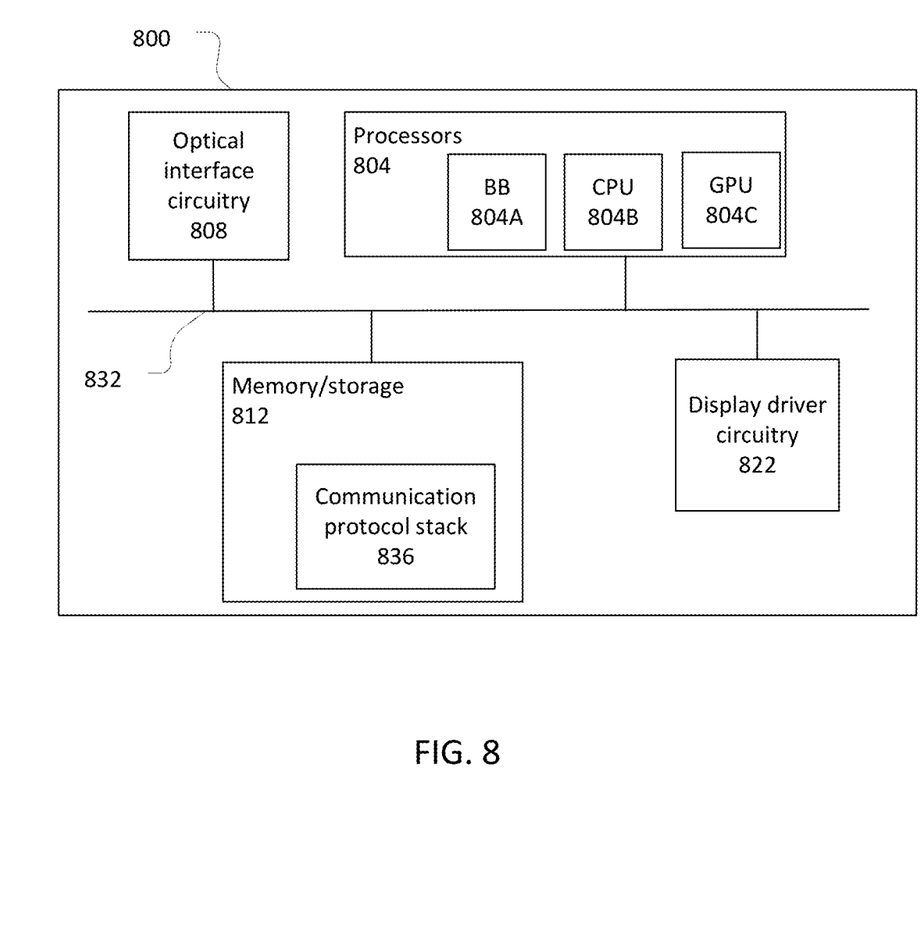
FIG. 8 illustrates a device in accordance with some embodiments.

FIG. 8 illustrates a computing system 800 in accordance with some embodiments. The computing system 800 may be similar to and substantially interchangeable with central office 104 of FIG. 1.

The computing system 800 may include processors 804, optical interface circuitry 808, memory/storage 812, and display driver circuitry 822. The components of the computing system 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the computing system 800. However, some of the components shown may be omitted, additional components may be present, and a different arrangement of the components shown may occur in other implementations.

The components of the computing system 800 may be coupled with various other components over one or more interconnects 832, which may represent any type of interface, input/output, bus (local, system, or expansion), transmission line, trace, or optical connection that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the computing system 800 to perform operations as described herein.

In some embodiments, the baseband processor circuitry 804A may access a communication protocol stack 836 in the memory/storage 812 to communicate over a wireless network interface. In general, the baseband processor circuitry 804A may access the communication protocol stack 836 to perform user/data plane functions at various layers of a communication protocol.

The baseband processor circuitry 804A may generate or process waveforms that carry the signals of the control/data channels. The processors 804 may incorporate those waveforms into the optical signals by way of the LO and modulated signal components as described herein. The optical signals may be communicated over a fiber-optical connection via the optical interface circuitry 808.

The memory/storage 812 may include one or more non-transitory, computer-readable media that include instructions (for example, communication protocol stack 836) that may be executed by one or more of the processors 804 to cause the computing system 800 to perform various operations described herein. The memory/storage 812 includes any type of volatile or non-volatile memory that may be distributed throughout the computing system 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The display driver circuitry 822 may include software and hardware elements that operate to control a display device of a remote UE. In some embodiments, the computing system 800 may further include audio drivers to control and allow access to one or more audio devices of the remote UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes an access point comprising: an interface to be coupled with a fiber-optical connection; a splitter coupled with the interface to receive an optical signal via the fiber-optical connection, the optical signal to have a first local oscillator (LO) component and a modulated signal component that has a data channel or a control channel, the splitter to provide a first portion of the optical signal to a first transmit chain and a second portion of the optical signal to a second transmit chain; the first transmit chain having a first photodiode that is to generate a first electrical signal based on the first portion of the optical signal and a first antenna to transmit a first over-the-air (OTA) signal based on the first electrical signal; and the second transmit chain having a second photodiode that is to generate a second electrical signal based on the second portion of the optical signal and a second antenna to transmit a second OTA signal.

Example 1 includes the access point of example 1 or some other example herein, wherein: the first transmit chain has a first phase shifter to shift a phase of the first portion of the optical signal by a first amount; and the second transmit chain has a second phase shifter to shift a phase of the second portion of the optical signal by a second amount.

Example 3 includes the access point of example 2 or some other example herein, wherein the modulated signal component has a control channel with control signals to: control the first phase shifter to shift the phase of the first portion of the optical signal by the first amount; and control the second phase shifter to shift the phase of the second portion of the optical signal by the second amount.

Example 4 includes the access point of example 2 or some other example herein, wherein the first and second phase shifters comprise plasmonic phase shifters.

Example 5 includes the access point of example 1 or some other example herein, wherein the first photodiode is to generate the first electrical signal with a frequency that is equal to a difference of a first frequency of the LO component and a second frequency of the modulated signal component.

Example 6 includes the access point of example 1 or some other example herein, further comprising: first channel components having the splitter, the first transmit chain, and the second transmit chain, the first channel components to a receive a first channel of the optical signal that includes a first polarization; and second channel components to receive a second channel of the optical signal having a second polarization.

Example 7 includes the access point of example 6 or some other example herein, wherein the first and second channels each have a 25 gigahertz bandwidth.

Example 8 includes the access point of example 1 or some other example herein, further comprising: an antenna array having the first antenna and the second antenna; and a dielectric lens coupled with the antenna array to amplify the first and second OTA signals.

Example 9 includes the access point of example 1 or some other example herein, further comprising: sending out radar signals in a terahertz frequency range; receiving reflections that correspond to the radar signals reflecting off of objects in a vicinity of the access point; and transmitting an uplink signal to the central office based on receiving the reflections.

Example 10 includes the access point of example 1 or some other example herein, further comprising: one or more depth-sensing cameras to capture image and depth information of an area in a vicinity of the access point; and the access point to transmit the image and depth information to a central office via the fiber-optical connection.

Example 11 includes the access point of example 1 or some other example herein, wherein the optical signal has a control signal to: control a gain provided by the first and second photodiodes.

Example 12 includes the access point of example 1 or some other example herein, further comprising: one or more low-noise amplifiers (LNAs) to amplify one or more signals received via one or more antennas; and one or more Mach-Zehnder modulators (MZMs), the one or more MZMs to receive one or more phase shifted local oscillator signals and the one or more signals as amplified by the one or more LNAs and to provide one or more optical signals; and a combiner to generate a combined optical signal from the one or more optical signals and to provide the combined optical signal to the interface.

Example 13 includes the access point of example 1 or some other example herein, wherein the optical signal, the first OTA signal, and the second OTA signal share a bandwidth or time-division duplexing structure.

Example 14 includes an apparatus comprising: an interface to be coupled with a fiber-optical connection; and control circuitry coupled with the interface, the control circuitry to: generate an optical signal that has a local oscillator (LO) component and a modulated signal component having a data channel with data directed to a user equipment (UE), and a control channel with control signals to control phase shifts for a plurality of phase shifters in an access point to provide transmit or receive beamforming by the access point; and transmit the optical signal to the access point via the fiber-optical connection.

Example 15 includes the apparatus of example 14 or some other example herein, wherein the UE is a wearable UE and the control circuitry comprises: a display driver to generate the data as pixel data to drive one or more displays on the wearable UE.

Example 16 includes the apparatus of example 15 or some other example herein, wherein the control circuitry is to: receive image and depth information of an area in a vicinity of the access point; and generate the pixel data based on the image and depth information.

Example 17 includes the apparatus of example 15 or some other example herein, wherein the control circuitry is further to: receive, from the access point or the wearable UE, sensor or image data; perform, based on the sensor or image data, a simultaneous localization and mapping (SLAM) operation, a visual odometry (VO) operation, a dense reconstruction operation, or a six-degrees of freedom (6DoF) operation; and generate the pixel data based on the SLAM operation, the VO operation, the dense reconstruction operation, or the 6DoF operation.

Example 18 includes the apparatus of example 14 or some other example herein, wherein the control channel further comprises control signals to control a gain provided by one or more photodiodes in the access point.

Example 19 includes the apparatus of example 14 or some other example herein, wherein the control channel further comprises control signals to control phase shifts for a plurality of phase shifters in the UE for receive or transmit beamforming at the UE.

Example 20 includes the apparatus of example 14 or some other example herein, wherein the optical signal includes a first channel to be transmitted with a first polarization and a second channel to be transmitted with a second polarization.

Example 21 includes the apparatus of example 14 or some other example herein, wherein the control circuitry is further to: receive, from the access point or the UE, feedback that includes measurement, image, or sensor data; and generate the control signals to control phase shifts for the plurality of phase shifters based on the feedback.

Example 22 includes the apparatus of example 13 or some other example herein, further comprising: receiving, from the access point, an uplink signal based on reflections of a radar signal transmitted by the access point; calculating a range and direction of the UE with respect to the access point based on the uplink signal; and generating the control signals to control the phase shifts based on the range and direction of the UE.

Example 23 includes a UE comprising: a micro-light emitting diode (µLED) panel to output an image; one or more receive chains to receive one or more over-the-air (OTA) signals that include pixel data from a display driver; control circuitry to: receive one or more digital signals from the one or more receive chains, demodulate the one or more digital signals to access the pixel data; and drive the µLED display to output the image based on the pixel data.

Example 24 includes the UE of example 23 or some other example herein, further comprising: a voltage controlled oscillator (VCO) with a resonant tunneling diode, the VCO to generate a first local oscillator (LO) signal within a terahertz (THz) frequency range; and a first receive chain of the one or more receive chains having: an antenna to generate an electrical signal based on a first OTA signal of the one or more OTA signals; a mixer to generate a mixed signal based on the first LO signal and an amplified version of the electrical signal; and an in-phase/quadrature (I/Q) demodulator to generate I/Q signals based on the mixed signal and a pair of second LO signals, the pair of second LO signals having a frequency that is equal to one fourth of a frequency of the first LO signal; and an analog-to-digital converter to convert the I/Q signals to a digital signal of the one or more digital signals and to provide the digital signal to the control circuitry.

Example 25 includes the UE of example 23 or some other example herein, further comprising: a voltage controlled oscillator (VCO) with a resonant tunneling diode, the VCO to generate a first local oscillator (LO) signal within a terahertz (THz) frequency range; a mixer to generate a mixed signal based on the first LO signal and a second LO signal having a frequency that is equal to one fourth of a frequency of the first LO signal; a digital-to-analog converter to receive a digital uplink signal from the control circuitry and to generate an analog uplink signal; and a power amplifier to amplify the mixed signal based on the analog uplink signal.

Example 26 includes the UE of example 23 or some other example herein, wherein the control signal is to generate the digital uplink signal with amplitude shift key modulation.

Example 27 includes the UE of example 23 or some other example herein, wherein the control circuitry is to demodulate the one or more digital signals using quadrature amplitude demodulation.

Example 28 includes the UE of example 23 or some other example herein, further comprising: one or more infrared (IR) light emitting diodes (LEDs); and one or more infrared cameras to capture an IR image from the one or more IR LEDs, wherein the control circuitry is to feedback gaze-tracking data related to the IR image to a central office.

Example 29 includes the UE of example 23 or some other example herein, further comprising: one or more infrared (IR) metasurfaces that are panels mounted to a glasses frame of the UE or are visible-light transparent IR-metasurfaces brought onto a waveguide/lightguide optical combiner such that an environment IR light emitting diode signal is relayed to pupils of a user via the one or more IR-metasurface and such that the reflection from the pupils is relayed to the environment.

Example 30 may include a method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 32 may include an apparatus comprising logic, modules, or circuitry to perform one or more elements of a method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of examples 1-29, or portions thereof.

Example 35 may include a signal as described in or related to any of examples 1-29, or portions or parts thereof.

Example 36 may include a datagram, information element, packet, frame, segment, PDU, or message as described in or related to any of examples 1-29, or portions or parts thereof, or otherwise described in the present disclosure.

Example 37 may include a signal encoded with data as described in or related to any of examples 1-29, or portions or parts thereof, or otherwise described in the present disclosure.

Example 38 may include a signal encoded with a datagram, IE, packet, frame, segment, PDU, or message as described in or related to any of examples 1-29, or portions or parts thereof, or otherwise described in the present disclosure.

Example 39 may include an electromagnetic signal carrying computer-readable instructions, wherein execution of the computer-readable instructions by one or more processors is to cause the one or more processors to perform the method, techniques, or process as described in or related to any of examples 1-29, or portions thereof.

Example 40 may include a computer program comprising instructions, wherein execution of the program by a processing element is to cause the processing element to carry out the method, techniques, or process as described in or related to any of examples 1-29, or portions thereof.

Example 41 may include a signal in a wireless network as shown and described herein.

Example 42 may include a method of communicating in a wireless network as shown and described herein.

Example 43 may include a system for providing wireless communication as shown and described herein.

Example 44 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An access point comprising:
   an interface to be coupled with a fiber-optical connection;
   a splitter coupled with the interface to receive an optical signal via the fiber-optical connection, the optical signal to have a first local oscillator (LO) component and a modulated signal component that has a data channel or a control channel, the splitter to provide a first portion of the optical signal to a first transmit chain and a second portion of the optical signal to a second transmit chain;
   the first transmit chain having a first photodiode that is to generate a first electrical signal based on the first portion of the optical signal and a first antenna to transmit a first over-the-air (OTA) signal based on the first electrical signal, wherein the first photodiode is to generate the first electrical signal with a frequency that is equal to a difference of a first frequency of the LO component and a second frequency of the modulated signal component; and
   the second transmit chain having a second photodiode that is to generate a second electrical signal based on the second portion of the optical signal and a second antenna to transmit a second OTA signal.

2. The access point of claim 1, wherein:
   the first transmit chain has a first phase shifter to shift a phase of the first portion of the optical signal by a first amount; and
   the second transmit chain has a second phase shifter to shift a phase of the second portion of the optical signal by a second amount.

3. The access point of claim 2, wherein the modulated signal component has a control channel with control signals to:
   control the first phase shifter to shift the phase of the first portion of the optical signal by the first amount; and
   control the second phase shifter to shift the phase of the second portion of the optical signal by the second amount.

4. The access point of claim 2, wherein the first and second phase shifters comprise plasmonic phase shifters.

5. The access point of claim 1, further comprising:
   first channel components having the splitter, the first transmit chain, and the second transmit chain, the first channel components to a receive a first channel of the optical signal that includes a first polarization; and
   second channel components to receive a second channel of the optical signal having a second polarization.

6. The access point of claim 5, wherein the first and second channel components each have a 25 gigahertz bandwidth.

7. The access point of claim 1, further comprising:
   an antenna array having the first antenna and the second antenna; and
   a dielectric lens coupled with the antenna array to amplify the first and second OTA signals.

8. The access point of claim 1, further comprising:
   a radar component to send out radar signals in a terahertz frequency range, and
   receive reflections that correspond to the radar signals reflecting off of objects in a vicinity of the access point,
   wherein the access point is to transmit an uplink signal to a central office based on receipt of the reflections.

9. The access point of claim 1, further comprising:
   one or more depth-sensing cameras to capture image and depth information of an area in a vicinity of the access point; and
   the access point to transmit the image and depth information to a central office via the fiber-optical connection.

10. A method comprising:
    receiving an optical signal via a fiber-optical connection, the optical signal to have a first local oscillator (LO) component and a modulated signal component that has a data channel or a control channel;
    providing a first portion of the optical signal to a first transmit chain and a second portion of the optical signal to a second transmit chain;
    generating a first electrical signal based on the first portion of the optical signal; and
    generating a second electrical signal based on the second portion of the optical signal;
    receiving, with first channel components, a first channel of the optical signal that includes a first polarization; and
    receiving, with second channel components, a second channel of the optical signal having a second polarization,
    wherein the first and second channel components each have a 25 gigahertz bandwidth.

11. The method of claim 10, further comprising:
    transmitting a first over-the-air (OTA) signal based on the first electrical signal; and
    transmitting a second OTA signal based on the second electrical signal.

12. The method of claim 10, further comprising:
    shifting a phase of the first portion of the optical signal by a first amount; and
    shifting a phase of the second portion of the optical signal by a second amount.

13. The method of claim 12, wherein the modulated signal component has a control channel with control signals to: control the shifting of the phase of the first portion of the optical signal by the first amount; and control the shifting of the phase of the second portion of the optical signal by the second amount.

14. The method of claim 10, further comprising:
generating the first electrical signal with a frequency that is equal to a difference of a first frequency of the LO component and a second frequency of the modulated signal component.

15. The method of claim 10, further comprising:
amplifying the first and second OTA signals with a dielectric lens.

16. A method comprising:
receiving an optical signal via a fiber-optical connection, the optical signal to have a first local oscillator (LO) component and a modulated signal component that has a data channel or a control channel;
providing a first portion of the optical signal to a first transmit chain and a second portion of the optical signal to a second transmit chain;
generating a first electrical signal based on the first portion of the optical signal;
generating a second electrical signal based on the second portion of the optical signal;
transmitting radar signals in a terahertz frequency range;
receiving reflections that correspond to the radar signals reflecting off of objects; and
transmitting an uplink signal to a central office based on receiving the reflections.

17. A method comprising:
receiving an optical signal via a fiber-optical connection, the optical signal to have a first local oscillator (LO) component and a modulated signal component that has a data channel or a control channel;
providing a first portion of the optical signal to a first transmit chain and a second portion of the optical signal to a second transmit chain;
generating a first electrical signal based on the first portion of the optical signal;
generating a second electrical signal based on the second portion of the optical signal;
capturing image and depth information of an area; and
transmitting the image and depth information to a central office via the fiber-optical connection.

* * * * *